Patented Aug. 24, 1937

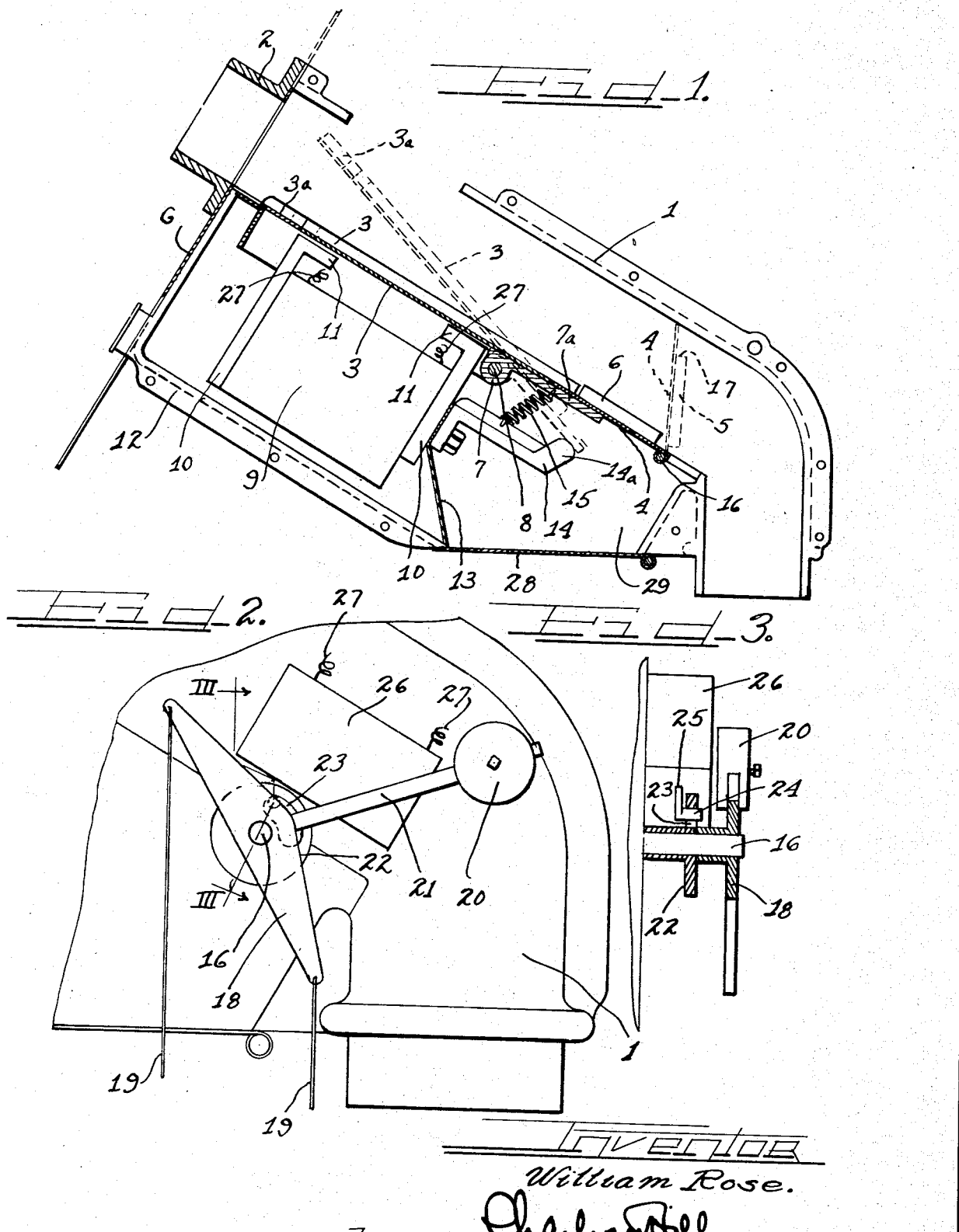

2,090,639

UNITED STATES PATENT OFFICE 2,090,639

MAGNETIC SEPARATOR

William Rose, Chicago, Ill., assignor to B. F. Gump Company, Chicago, Ill., a corporation of Illinois Application August 23, 1934, Serial No. 741,056

6 Claims. (Cl. 209—228)

This invention relates to a magnetic separator that is adapted for removing metal such as nails or the like from grain or coffee beans and similar products.

The magnetic separators now in use have a stationary magnetic plate over which non-magnetic material flows, and to which the metal adheres. When the plate is de-energized, the metal upon the magnetic plate is supposed to gravitate down the plate and drop through a trap door. However, due to the fact that some iron or metal particles, especially the small pieces, often become magnetized and act as magnets themselves, they cling to the magnetic plate after de-energization of the electro-magnet, and must be removed by hand. This has proved objectionable, especially when the parts are mounted in a grain or coffee spout.

This invention is designed to overcome the above noted objection in the provision of a tiltable magnetic plate that is automatically given a quick tilt and jar to dislodge any metal clinging thereto.

In addition to the foregoing, the electro-magnet used in the device is controlled by the trap door of the separator which is manually operated and which causes the operation of the switch in the electric line to the electro-magnet when the trap door is adjacent its open or closed position.

The invention comprises the novel structure and combination of parts hereinafter described and more particularly pointed out and defined in the appended claims.

In the accompanying drawing which illustrates a preferred form of this invention and in which similar reference numerals refer to similar features in the different views:

Figure 1 is a sectional view through a spout to which this invention is applied;

Figure 2 is a fragmentary enlarged side elevational view of the same;

Figure 3 is a sectional view taken upon the line III—III of Fig. 1 looking in the direction of the arrows.

The invention is shown as applied to a spout 1 for feeding coffee beans or grain to a mill. The spout is shown as attached to a pipe 2 which delivers the material such as grain or coffee beans to the spout. A shut off gate G between the pipe and spout controls the flow of material through the spout. A portion of the bottom of the spout is formed by a tiltable magnetic plate 3 and a non-magnetic trap door 4. The plate 3 and trap door 4 have upstanding edge flanges 5 and 6 respectively to form a sort of guideway for the material flowing through the spout.

The magnetic plate 3 consists of some material that can be strongly magnetized, such as soft iron, for example. To the rear end of the plate 3, there is attached a non-magnetic strip 3ª such as brass, for example, for a purpose that will later appear. The plate 3 is provided with bearing ears 7, spaced rearwardly from its forward end for loosely receiving a hinge rod 8 which may be suitably sustained by bearings upon the sides of the spout. The ears 7 are preferably on a plate 7ª attached to the bottom of the magnetic plate. Below the tiltable plate 3, there is an electro-magnet 9 having pole pieces 10 with angular portions 11 extending parallel to and just below plate 3. The electro-magnet is shown as inclosed in a casing 12 attached to the spout. A bracket 13 in the casing supports an arm 14 with an upturned end 14ª. A coil spring 15 is attached at one end to said arm and at its other end to the plate 7ª forward of the hinge rod 8.

The trap door 4, which preferably consists of non-magnetic material such as brass, is hinged to the bottom of the spout by means of a rotatable rod 16 to which said door is fastened to turn therewith. The side flanges 5 of the trap door are cut away for a short distance from the rear end of the door as indicated at 17. The unflanged end of the trap door is designed to fit between the flanges of the magnetic plate 3. The rear portion of the trap door is designed to overlap a portion of the plate 7ª which extends beyond the forward end of plate 3, and closely approaches the end of the magnetic plate 3 to form a substantially continuous bottom.

The trap door shaft 16 extends beyond one side of the casing for supporting a crank or lever 18 firmly attached thereto. The lever 18 is attached to said shaft 16 at its middle point, and to the ends of the lever are attached operating rods or cables 19 for remote control of said lever. A counter weight 20 adjustably attached to an arm 21 fastened upon the hub of the lever is preferably used in connection with the trap door.

Adjacent the inner side of the lever 18, there is a disc 22 fastened upon the shaft 16. This disk has an arcuate oblong aperture 23 for receiving the angled end 24 of a switch lever 25 extending from a control box 26 mounted upon the side of the spout in any suitable manner. Electrical conduits 27 connect the control box with the electro-magnet 3. It will of course be understood that the control box is connected to some suitable source of electrical energy. As such a control box and its hook-up are well known, the same has not been fully illustrated.

Describing now the use or mode of operation of this novel separator, it will be assumed that the parts are in their operative positions in which grain or coffee beans are passing through the spout 1. The metal in such grain or coffee will be attracted by the magnetic plate 3 as the electro-magnet 9 is now energized, and due to the non-magnetic or brass strip 3ª, the metal will not collect at the rear end of the strip 3ª, but will jump over such brass strip to the magnetic plate 3. When it is desired to remove the metal from the magnetic plate 3, the gate G is first closed to stop the flow of material, and as soon as the spout is clear of grain or coffee beans, the lever 18 is actuated for rotating shaft 16 for closing the switch for de-energizing the electro-magnet and elevating the trap door 4. As soon as the electro-magnet is de-energized, the spring 15 will cause the plate 3, which has also become de-energized, to quickly tilt to the dotted line position. The spring 15 acts quickly and causes the rear portion of the plate to fly upwardly, as it were, and at the same time the forward end will strike the upturned end 14ª of the bracket 14 and impart a sudden jar to the plate and will jar loose any polarized metal or magnetized particle of iron clinging thereto. This sudden upward movement of the rear end of the plate 3 will also project the metal forwardly, some of it striking the raised trap door. This projected metal will fall through the opening left by the trap door and into the metal receiving chamber 29 therebelow. The metal may be removed through the door 28 at the bottom of the chamber whenever desired.

For the sake of clearness, the lever 18 has been shown in Fig. 2 in its inoperative position with the switch open. When the lever is swung to close the switch, the trap door will move a considerable distance toward its closed full line position before the switch lever 25 will be moved to its closed position. Likewise, when opening the trap door, it will move a considerable distance toward open position before the switch lever is actuated to open the switch. This delayed operation of the switch with respect to the trap door is caused by the lost motion due to the slot 23, as is obvious. The trap door will hence be in elevated position to intercept any metal thrown forwardly by the plate 3.

As soon as the electro-magnet is energized, it will draw the magnetic plate 3 downwardly into full line position and retain the same in such position against the tension of the spring 15. While the magnetic force is sufficiently powerful to overcome the tension of the spring 15, the latter possesses sufficient strength to cause the rear end of the magnetic plate 3 to fly upwardly when the electro-magnet is de-energized.

From the foregoing, it will be apparent that a novel magnetic separator has been invented, which overcomes the objections heretofore noted, and obviates the removing of some of the metals from the magnetic plate by hand.

I am aware that many changes may be made and numerous details of construction may be varied through a wide range without departing from the principles of this invention, and I, therefore, do not purpose limiting the patent granted hereon otherwise than necessitated by the prior art.

I claim as my invention:

1. In a magnetic separator including a spout and an electro-magnet adjacent said spout, a magnetic plate hinged in the bottom of said spout and responsive to said electro-magnet, yielding means acting upon said plate for tilting the same when said electro-magnet is de-energized, means for arresting and jarring said plate, a trap door in advance of said plate, manually operable means for opening and closing said trap door, and means operable through the movement of said trap door for controlling said electro-magnet.

2. In a magnetic separator including a spout and an electro-magnet adjacent said spout, a pivotally mounted magnetic plate in the bottom of said spout responsive to said electro-magnet, yielding means for tilting said plate, means for arresting and jarring said plate and a trap door movable across said spout in advance of said plate for the purpose set forth.

3. In a magnetic separator including a spout and an electro-magnet adjacent said spout, a magnet plate pivotally mounted in the bottom of said spout for tilting movements and responsive to said electro-magnet, yielding means acting upon said plate for tilting the same when said electro-magnet is de-energized, means for arresting and jarring said plate, a manually operable trap door, and means controlled through the movement of said door for controlling said electro-magnet.

4. In a magnetic separator including a spout and an electro-magnet adjacent said spout, a magnetic plate pivoted to the bottom of said spout and responsive to said electro-magnet, means for automatically tilting said plate when said electro-magnet is de-energized, means for jarring said plate, a trap door in said spout, and manually operable means for opening and closing said trap door and simultaneously controlling said electro-magnet.

5. In a magnetic separator including a spout and an electro-magnet adjacent said spout, a magnetic plate pivotally mounted in the bottom of said spout and responsive to said electro-magnet, means for tilting said plate when said magnet is de-energized, means in the path of movement of said plate for jarring the same, a trap door in the bottom of said spout, means for elevating said trap door, and means for causing the de-energization of said electro-magnet when said trap door has been partially elevated.

6. In a magnetic separator including a spout and an electro-magnet adjacent said spout, a magnetic plate in said spout responsive to said electro-magnet, means for moving said plate for discharging the contents thereof when said electro-magnet is de-energized, means in the path of movement of said plate for jarring the same, a trap door, means for moving said trap door toward open position and means for causing a re-energization of said electro-magnet when said door has been partially closed.

WILLIAM ROSE.